Dec. 7, 1971  G. J. FREY  3,624,873
SLIDE-HOLDING CLIP
Filed March 27, 1970
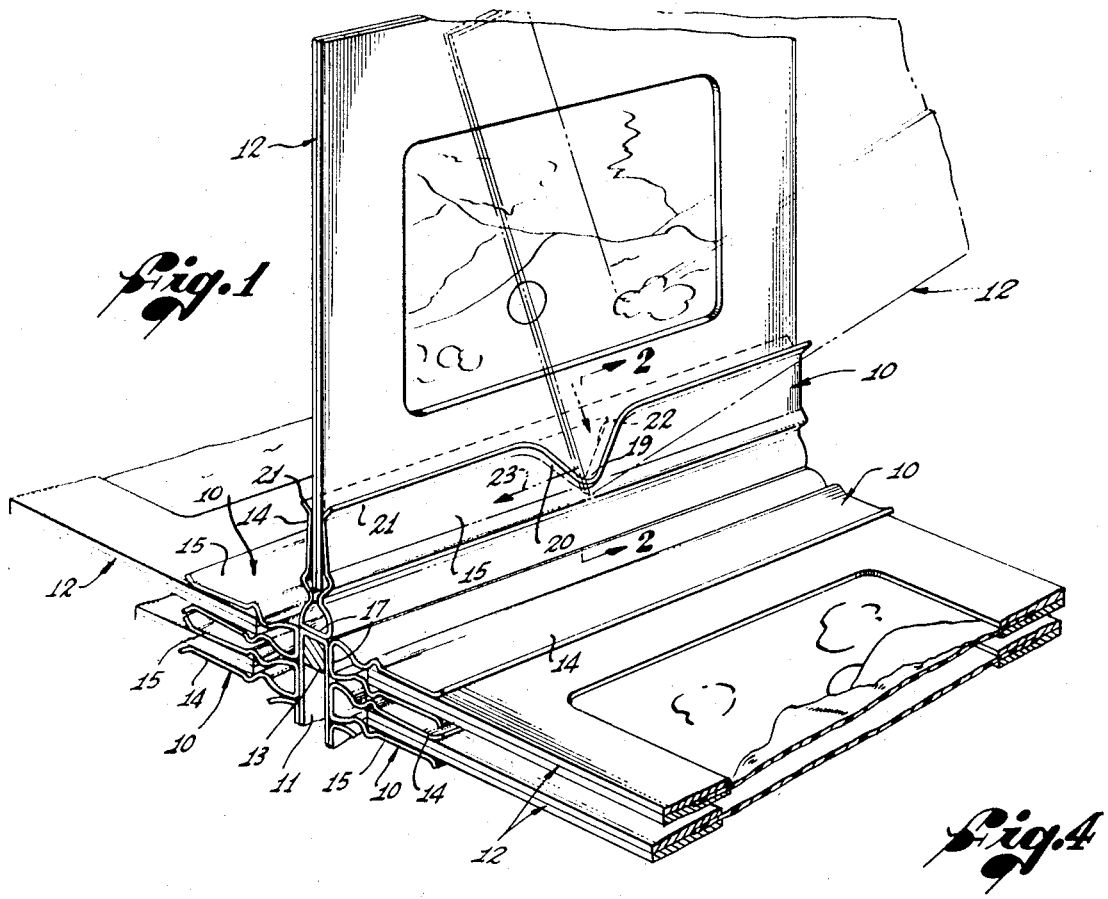
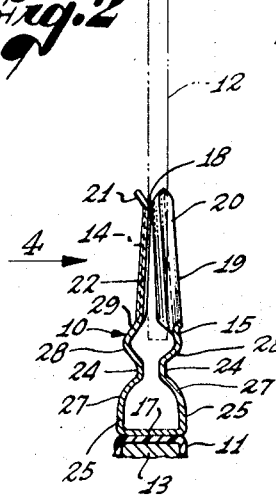
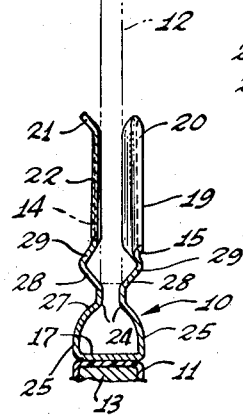
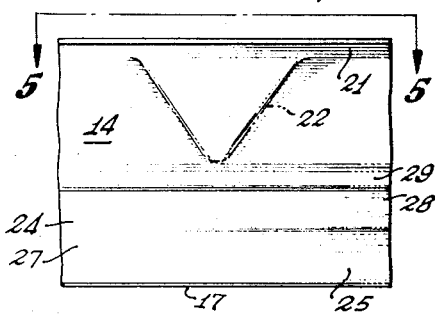
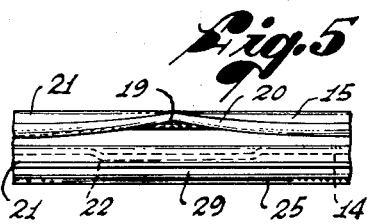
INVENTOR.
GERALD J. FREY
BY Fulwider, Patton, Rieber, Lee, and Utecht
ATTORNEYS

United States Patent Office 3,624,873
Patented Dec. 7, 1971

3,624,873
SLIDE-HOLDING CLIP
Gerald J. Frey, 1834 Devon Road,
Pasadena, Calif. 91103
Continuation-in-part of application Ser. No. 865,613,
Oct. 13, 1969. This application Mar. 27, 1970,
Ser. No. 23,230
Int. Cl. A44b 21/00; G09f 11/14
U.S. Cl. 24—259 FC                      15 Claims

ABSTRACT OF THE DISCLOSURE

A slide carrier having an endless flexible belt adapted to be supported on two spaced shafts of a slide projector magazine and having a plurality of generally U-shaped spring clips each having two spring fingers pressed together to receive and hold a slide. The free edges of the fingers are inclined away from each other to form an entry mouth, and a V-shaped, flanged notch is formed in one finger, in alignment with an indentation in the other finger to receive the corner of a slide which spreads the fingers to facilitate insertion of the slide. Stop ribs are formed on both fingers to form a false bottom in the clip.

CROSS-REFERENCE TO RELATED APPLICATION

This is a continuation-in-part of my copending application Ser. No. 865,613, filed Oct. 13, 1969, entitled: Magazine-Type Slide Projector.

BACKGROUND OF THE INVENTION

This invention relates generally to slide projectors and, more particularly, to clips mountable on an endless slide carrier to hold individual transparent slides on the carrier for feeding through, and projection by, a slide projector.

The clip of the present invention is designed specifically for use on a magazine-mounted endless flexible carrier of the type shown generally in Pat. No. 3,170,369 and shown in more detail in my above-identified application. Each clip has a base attachable to the flexible carrier in transverse relation therewith, and has a pair of spring fingers projecting outwardly from the base, away from the carrier, with free edge portions of the clip more closely spaced than the known and predetermined thickness of the usual rectangular cardboard frames on slides, the fingers preferably being pressed together adjacent their free ends for tight gripping of the frames, and must be spread apart for insertion of frames in the clips.

With a plurality of such clips attached to the carrier in closely spaced and parallel side-by-side relation, a corresponding number of slides can be mounted semi-permanently on the carrier for viewing in a projector of the type described in the aforesaid patent and application, to which reference is made for details of construction and operation not contained herein. Successive slides are fed around a flat-sided, preferably rectangular, shaft of the magazine into a projection position in which the slide to be projected extends out of the end of the magazine at right angles with the slides on both sides of the projection position. After projection of one slide has been completed, the carrier is advanced to feed the next slide into the projection position.

SUMMARY OF THE INVENTION

The present invention resides in an improved spring clip for a slide carrier of the foregoing general character which greatly simplifies and expedites the procedure used to load the carrier initially with a series of slides to be projected, and which also insures that adjacent slides on each side of the projection position cannot hang down or droop into the line of projection of the slide in the projection position. Moreover, the clip of the invention is designed for inexpensive mass-production as a single-piece unit which very effectively grips and holds a slide.

To facilitate insertion of a slide in the clip, the free edge portions of the spring fingers of the preferred embodiment are provided with diverging edge portions beyond the line of closest spacing between the fingers, to form an entry mouth for receiving slides edgewise between the fingers, and one of the fingers is formed with a notch, preferably V-shaped, between its ends. The sides of the notch have flanges thereon that are inclined away from the other finger to receive a corner of the slide edgewise into the notch and permit edgewise insertion of the slide between the fingers from the notch as a starting point.

The V of the preferred notch is formed with an angle smaller than the angle of the corner of the slide frame so that the fingers are spread apart on both sides of the notch as the corner is inserted, and an indentation is formed in the other finger in alignment with the notch to facilitate insertion of the corner.

To eliminate interference of adjacent slides with the slide in the projection position, each of the clips has stop means thereon spaced outwardly from the base a preselected distance to abut against the inner edge of the slide and hold the inner edge parallel to the carrier but in outwardly spaced relation with the base of the clip. Such stop means preferably comprise opposed internal ribs on the adjacent sides of the two spring fingers, spaced outwardly from the base of the clip to prevent insertion of a slide fully into the clip, thus holding the slide in the projection position beyond the position of any drooping slide in an adjacent position.

Other objects and advantages of the invention will become apparent from the following detailed description, taken in conjunction with the accompanying drawings.

BRIEF DESCRIPTION OF THE DRAWINGS

FIG. 1 is an enlarged, fragmentary perspective view showing one end portion of a flexible carrier equipped with several clips embodying the novel features of the present invention, each clip being shown with a slide therein;

FIG. 2 is an enlarged cross-sectional view taken through one of the clips of FIG. 1, substantially along the line 2—2 of FIG. 1, and showing the condition of the clip prior to insertion of a slide;

FIG. 3 is a view similar to FIG. 2 with a clip fully inserted;

FIG. 4 is a fragmentary elevational view of one side of the clip, taken in the direction of the arrow 4 of FIG. 2; and FIG. 5 is a fragmentary view of the outer side of the clip, taken along the line 5—5 of FIG. 4.

DETAILED DESCRIPTION

As shown in the drawings, the invention is embodied in a plurality of clips 10 of generally U-shaped cross-section that are arranged in side-by-side parallel relation on a flexible carrier 11 to hold a series of slides 12 on the carrier and in a slide magazine (not shown) in which the carrier is mounted. The magazine, which may be of the type disclosed in the aforesaid patent and application, is insertible into a slide projector for projection of the slides in the manner described in the patent and the application.

For a general background with respect to the magazine and the projector, it will be sufficient to note that the carrier 11 is an endless flexible belt that is mounted on two flat-sided and preferably rectangular shafts in the magazine, one of the shafts being illustrated in cross-section at 13 in FIGS. 1–3. A relatively large number of slides can be stored in the magazine and, when the magazine is inserted in the projector, can be fed one by one into a projection position in which the slide projects away from one side of one of the shafts, much in the same manner as the slide 12 shown in full lines at the top of FIG. 1.

Typically, however, slides will be inserted in the clips 10 on the carrier 11 through an open upper end of the magazine when the clips are in the top position shown in FIG. 1, and will be projected when in the downwardly projecting position adjacent the open lower end. This has the advantage of permitting insertion of slides in an easily accessible location, and with the slides upright with reference to the orientation of the transparency thereof. Then each slide is inverted as it is fed from the loading position in FIG. 1 to the oppositely extending projection position, and the projected image from the slide thus is upright as a result of the inversion of the image by the optical system of the projector.

To hold the slides 12 securely in place on the carrier 11, each of the clips 10 is formed with two spring fingers 14 and 15 projecting outwardly from the opposite side edges of an elongated base 17 attached to the carrier 11, the free edge portions of the fingers being more closely spaced than the known thickness of the frames of the slides 12 to be held so as to grip each frame tightly in its associated clip. Preferably, the free edge portions initially are pressed tightly together along a line 18 (FIG. 2) spaced outwardly from the base, and are spread resiliently apart to receive the slide, thus being stressed to clamp the slide tightly in the clip.

In accordance with a primary aspect of the present invention, a notch 19 is formed in one of the spring fingers, herein the finger 15, between the ends of the clip 10, to receive a corner of a slide to be inserted in the clip, and a flange 20 is formed along the side edges of the notch and inclined away from the other finger 14 to facilitate insertion of the corner between the two spring fingers. The notch preferably is V-shaped, and herein has edges that are arranged at an angle less than ninety degrees so as to be narrower than the corner of the usual rectangular frame, which thus spreads the fingers on both sides of the notch when centrally inserted therein. The free edge portions 21 of the fingers 14, 15 diverge on both sides of the notch to receive the remainder of the frame edgewise on either side of the notch, thus permitting the slide to be seated fully in the clip from either side of the notch, and an indentation 22 preferably is provided in the finger 14 to facilitate initial insertion of the corner into the notch.

In this instance, the free edge portions 21 of the two fingers 14, 15 are inclined away from a central plane at angles on the order of forty-five degrees, and this incline on the finger 15 extends across the full length of the finger with a V-shaped dip along the notch 19. The edge portion 21 of the finger 14 is simply a straight flange. Preferably, the indentation 22 is a V-shaped crimped or off-set area formed in the finger 14 in alignment with the notch 19 to increase the separation of the fingers at the notch for easier insertion of the corner of the slide. This area is indicated by broken lines in FIGS. 1 and 5 and dot-dash lines in FIG. 4. The flange 20 along the walls of the notch, and the adjacent parts of the edge portion 21, may be inclined away from the finger 14 toward the center of the notch, as will be seen in FIG. 5, also to facilitate insertion of the corner of the slide.

With the foregoing arrangement, the corner of the slide 12 to be held in a clip 10 is inserted into the notch 19 with one side of the slide guided against the inside surface of the finger 14 and with the two edges of the slide forming the corner positioned to engage the inclined flange 20 along the notch. Thus, the corner cams the fingers apart on both sides of the notch and opens the clip for full insertion of the slide. After the slide has spread the fingers apart, it may be pressed fully into the clip while being slid edgewise along the clip in the direction of the arrow 23 in FIG. 1. While it is possible to insert the slide edgewise into the clip without making use of the notch, it has been found that the notch significantly reduces the effort required for insertion of the slides and expedites the loading of a magazine, which may hold as many as one hundred slides, or more.

Another important aspect of the invention is the positioning of slides 12 a preselected distance from the bases 17 of the clips 10 when the slides are fully inserted in the clips, thereby to avoid any possibility of interference with the projection of a slide in the projection position by an adjacent slide disposed generally at a right angle with the slide being projected. This is accomplished by providing stops in the clips that are spaced outwardly from the bases to engage the base edge of each slide and hold it parallel to, but spaced from, the base 17 and the carrier 11 so that any anticipated drooping of the adjacent slide does not bring such slide into the line of projection.

For this purpose, at least one of the fingers 14, 15 has an inwardly directed rib 24 spaced above the base 17 to form, in effect, a false bottom in the clip spaced above the base. Herein, two opposed ribs 24 are formed on the two fingers to restrict the clearance between the fingers to a space less than the thickness of the slide 12, sufficiently close to the base 17 that the normal flexing of the fingers does not increase this space to the thickness of the slide.

As shown most clearly in FIGS. 2 and 3, the illustrative clip 10 is formed integrally from one piece of material, preferably lightweight spring metal, with the base 17 in the form of a narrow, elongated strip having the inner ends of the spring fingers 14, 15 integrally joined to its side or longitudinal edges, substantially at right angles. The inner portion of each finger extends outwardly at 25 and then curves at 27 toward the other finger, the curve ending in the stop rib 24 which is formed with a flat inside surface more closely spaced to the surface of the other rib than the thickness of the slide frame.

Beyond this flat surface, each finger 14, 15 is inclined outwardly and away from the other finger at 28, then bends reversely at 29, to form an outside rib immediately above the stops 24. These outside ribs form the hinges of the two fingers about which the free edge portions swing during opening of the clip 10, as will be apparent from FIG. 3. Beyond each outside rib, the finger is substantially flat and inclined silightly toward the central plane to press against the other finger along the line indicated at 18 in FIG. 2. Then the free edge portion 21 of each finger is inclined reversely to diverge from the other finger, as previously described.

From the foregoing, it will be seen that the present invention provides a simple one-piece slide-holding clip 10 which may be mounted on an endless carrier 11 to receive and securely hold individual slides on the carrier. The simple flanged notch 19 in one of the spring fingers 14, 15 makes it possible to insert slides quickly and easily between the fingers of the clip, even when the fingers are pressed tightly together, and has no significant effect on the holding effectiveness of the clip. Moreover, the stop ribs 24 provide a false bottom in the clip in a simple and inexpensive manner to space the slide effectively from the base of the clip and the carrier on which the clip is mounted, thereby avoiding any adverse effect of drooping of adjacent slides during projection.

I claim:

1. A clip for holding transparent slides having rectangular frames of predetermined thickness insertible in said clip, said clip comprising a single piece of spring metal and having, in combination:

an elongated base of approximately the same length as the frame to be held in the clip;

two resiliently flexible spring fingers integrally joined to said base along the longitudinal edges thereof and extending outwardly from said base, said fingers having free edge portions pressed together along a line space outwardly from said base, and having diverging edge portions beyond said line forming an open mouth for insertion of a frame edgewise between the fingers; and means defining a generally V-shaped notch in one of said fingers between its ends and including a V-shaped flange along said notch inclined away from the other of said fingers to receive a corner of a frame to be held in the clip and permit the frame to be slid edgewise between said fingers from said notch.

2. A clip as defined in claim 1 further including a V-shaped indentation in the inside surface of the other of said fingers in alignment with said notch to facilitate insertion of said corner.

3. A clip as defined in claim 1 in which said flange forms an angle of less than ninety degrees to be cammed away from the other of said fingers on both sides of said notch as the corner is inserted in generally centered relation in the notch.

4. A clip for holding transparent slides having frames of predetermined thickness insertible in said clip, said clip comprising:
an elongated base;
two resiliently flexible spring fingers attached to and extending outwardly from said base along opposite longitudinal edges thereof, said fingers having free edge portions more closely spaced than said predetermined thickness and of approximately the same length as said base; and
means defining a notch in at least one of said fingers between the ends thereof and including a flange along at least one sidewall of said notch diverging from the other of said fingers and extending inwardly toward said base to receive a corner of a frame to be held in said clip and permit the corner to be moved edgewise, generally longitudinally of said fingers, from said notch toward one end of the clip while spreading said fingers apart.

5. A clip as defined in claim 4 further including diverging edges on said fingers between said notch and the other end of the clip forming an entry mouth between the fingers for edgewise insertion of the frame into the clip between said notch and said other end.

6. A clip as defined in claim 4 in which said notch is generally V-shaped and said flange extends along both sidewalls of said notch.

7. A clip as defined in claim 6 in which said sidewalls are disposed at an angle less than ninety degrees to receive a rectangular corner of a frame in generally centered relation with said corner engaging both of said flanges to cam said fingers apart.

8. A clip as defined in claim 6 in which said fingers are formed with diverging edge portions along their full length, the diverging edge portion of said one finger including a V-shaped dip along said notch to form said flange.

9. A clip as defined in claim 8 in which said diverging edge portion of said one finger and the flange thereof are inclined away from said other finger toward the center of said notch.

10. A clip as defined in claim 4 in which said other finger is formed with an indentation in the inner side thereof in alignment with said notch to facilitate initial insertion of said corner.

11. A clip as defined in claim 4 further including means on said clip forming a stop spaced outwardly a preselected distance from said base to abut against the inner edge of a slide in said clip and hold the slide in spaced parallel relation with the base.

12. A clip as defined in claim 11 in which said stop-forming means includes at least one inwardly extending longitudinal rib on one of said fingers parallel to said base.

13. A clip for holding transparent slides having frames of predetermined thickness insertible in said clip, said clip comprising:
an elongated base;
two resiliently flexible spring fingers attached to and extending outwardly from said base along opposite longitudinal edges thereof, said fingers having free edge portions more closely spaced than said predetermined thickness and of approximately the same length as said base; and
means defining a recess in the free edge portion of at least one of said fingers and having at least one sidewall extending inwardly toward said base, said sidewall being spaced from the free edge portion of the other of said fingers to receive a corner of a frame to be held in said clip between said sidewall and said other finger, and to permit the corner to be moved edgewise from said recess toward one end of the clip while spreading said fingers apart.

14. A clip as defined in claim 13 in which said one sidewall is inclined inwardly and toward one end of said clip.

15. A clip as defined in claim 14 in which said one sidewall is on a flange along one side of said recess, said flange diverging from said other finger to facilitate insertion of the corner between said fingers.

References Cited

UNITED STATES PATENTS

| | | | |
|---|---|---|---|
| 2,521,348 | 9/1950 | Davis | 40—98 |
| 3,023,474 | 3/1962 | Shears | 24—259 FC |
| 3,170,369 | 2/1965 | Frey et al. | 40—98 X |
| 3,354,516 | 11/1967 | Small | 24—81 B |

DONALD A. GRIFFIN, Primary Examiner

U.S. Cl. X.R.

40—98